United States Patent [19]

Koo

[11] 4,045,651
[45] Aug. 30, 1977

[54] ELECTRICALLY HEATED SOLDERING DEVICE

[76] Inventor: Richard C. M. Koo, 845 39th Ave., San Francisco, Calif. 94121

[21] Appl. No.: 652,910

[22] Filed: Jan. 28, 1976

[51] Int. Cl.$^2$ .......................... H05B 1/00; B23K 3/04; B25G 1/10
[52] U.S. Cl. ................................. 219/227; 16/116 R; 219/229; 219/531; 219/533; 228/51
[58] Field of Search ............................... 219/221–242, 219/533, 531; 30/140; 228/51–55; 16/116 R; 132/31 R, 37 R, 117, 118; 126/401–409, 413, 414

[56] References Cited

U.S. PATENT DOCUMENTS

| 1,415,479 | 5/1922 | Putnam | 219/236 |
| 3,121,781 | 2/1964 | Schoenwald | 219/531 X |
| 3,248,034 | 4/1966 | McNutt | 219/238 X |
| 3,336,462 | 8/1967 | Fuller | 219/227 |

FOREIGN PATENT DOCUMENTS

| 364,915 | 12/1922 | Germany | 219/229 |
| 633,020 | 12/1949 | United Kingdom | 219/237 |
| 558,366 | 1/1944 | United Kingdom | 219/229 |

Primary Examiner—A. Bartis
Attorney, Agent, or Firm—Warren, Chickering & Grunewald

[57] ABSTRACT

An electrically heated soldering device includes a housing having an elongated axis with an obtuse angle, an open end, a closed end and an intermediate opening. The outer dimensions of the housing are so dimensioned that the device can be held pencil-fashion with the portion of the housing between the open end and intermediate end grasped by the fingers and thumb of the hand with the portion of the housing between the intermediate opening and the closed end resting on the back of the hand between the thumb and index finger. An electric heating means is substantially coaxially positioned in the housing in spaced relation thereto and is provided with a soldering tip protruding out of the housing through said open end. The open end and the intermediate opening are substantially aligned to produce a chimney-like hollow space surrounding the hot parts of the heating means which carries away excess heat generated within the housing thereby maintaining the housing comfortably cool to touch.

3 Claims, 1 Drawing Figure

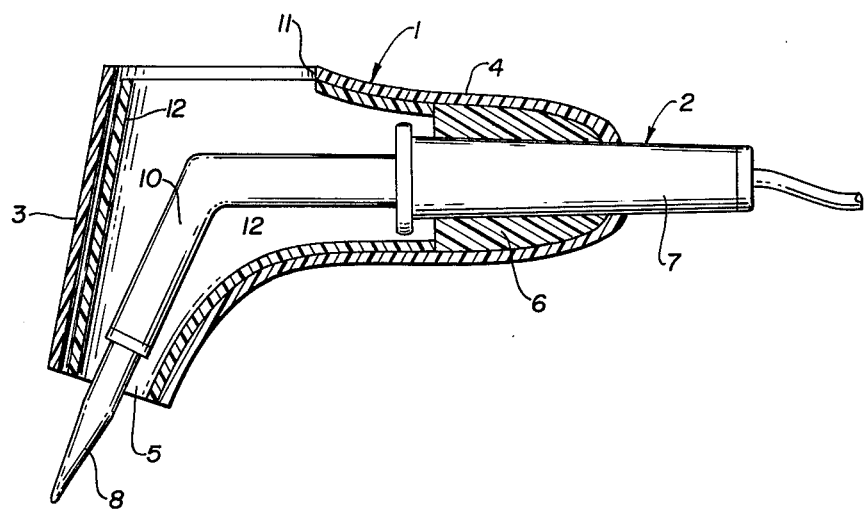

ELECTRICALLY HEATED SOLDERING DEVICE

BACKGROUND OF THE INVENTION

Soft solder is a very effective material for making mechanically sound and electrically conductive connections. With the increased use of miniaturized electrical equipment, electrical connections in very small circuits must be made both in assembling and in repairing such equipment. To use solder on small equipment, the solder contacting tip of the soldering device must be very small. However, regardless of the size of the tip, it must still be hot enough to melt solder.

In addition to being small, the solder contacting tip must be positioned and moved precisely to effect soldering exactly where it is required and to avoid heat damage to areas adjacent to the position where soldering is to be effected.

The best way to maneuver a small pointed object is to hold it in the manner of a pen or pencil, held by the fingertips with the thumb and fingers in opposition. The precision with which a tool can be used also increases if the fingertips can hold the tool quite close to the tip that is being maneuvered. This manner of grasping and using a tool not only provides for precise positioning and movement of the tool, but in addition it leaves the other hand free to hold or maneuver the work.

The heat of a soldering iron is concentrated at the tip, so hand-held soldering devices usually must be employed with the hand holding the soldering device positioned well away from the hot tip, and even in such position the soldering device can be uncomfortably hot.

THE INVENTION

This invention is a soldering device that avoids or greatly mitigates all of the above-noted problems. The device of this invention includes a housing made of a heat insulating material and having both an open end and a closed end as well as an intermediate opening. The long axis of the housing is in the shape of an obtuse angle, and the housing has an intermediate opening on the surface opposed to the inner surface of the obtuse angle, with that intermediate opening aligned with the end opening so that the hollow housing includes a chimney-like passageway. The device additionally has an electrically operated heating means which includes a solder contacting element and an electrically conductive means. The electrically operated heating means is positioned within the housing so that the solder contacting element protrudes from the open end of the housing while the opposite end of the electrically operated heating means is fixed within the closed end of the housing so that it is held firmly in position. The electrically operated heating means also includes an obtuse angle that is substantially the same obtuse angle as the one described by the axis of the housing, and the electrically operated heating means preferably is coaxial with the axis of the housing. Except for the portion of the electrically operated heating means that is fixed to the closed end of the housing, the electrically operated heating means is spaced from the interior wall of the housing. The electrically operated heating means is supplied with electric energy, and preferably it includes a conducting portion which is relatively cool in use to supply electrical energy to the hot tip that contacts the solder.

DETAILED DESCRIPTION OF THE INVENTION

The present invention may be best described with reference to the accompanying drawing the sale FIGURE of which illustrates a partial sectional view of a device embodying this invention. The embodiment of the invention illustrated herein is intended to be illustrative rather than limiting on the invention.

The device of this invention as illustrated in the accompanying drawing includes a heat insulating housing generally designated 1 and an electrically operated heating means generally designated 2. The housing 1 is made from heat-resisting and heat-insulating material, such as thermosetting plastics or resins, and the electrically operated heating means includes electrical conductors and resistance elements and other circuitry for operating a small soldering device as known to the art.

The housing 1 includes a forward portion 3 and a rear portion 4 which have axes forming an obtuse angle. The forward portion 3 terminates in an open end 5, while the rear portion 4 terminates in a closed end in which the electrically operated heating device 2 is fixed. An intermediate material, such as illustrated at 6, which may be an adhesive or a thermosetting plastic or resin, may be employed to insure that the electrically operated heating element 2 is firmly fixed within the housing 1. The element 2 may be fixed within the housing 1 by mechanical means, such as threaded elements and holding nuts, in a manner such as is known to the art.

Ordinarily, the rear portion of electrically operated heating means 2, indicated by reference number 7, simply conducts electricity and does not contain resistance heating elements. Accordingly, the only heat that would be encountered in the rear portion of the housing 4 would be thermal conduction through the electrically operated heating means and radiation. Thus, with even a moderate amount of thermal insulation, the rear portion 4 of the housing will remain comfortably cool to the touch.

The forward portion 3 of the housing surrounds the very hot portions of the device, such as the solder contacting tip 8 and resistance heating means contained in the intermediate portion of the heating device illustrated at 10. In the device of the present invention, all portions of the electrically operated heating means except the electrically conductive part bedded in the rear portion of the housing are spaced from and not in contact with any portion of the housing 1. In addition, the housing 1 includes an intermediate opening 11 that is aligned with the end opening 5 to provide a relatively straight, chimney-like open passageway surrounding all of the hot portions of the electrically operated heating device 2. This arrangement of openings and spaces causes a strong updraft in the space between the heating means and the housing because the relatively hot air in the space is substantially less dense than the air in the region where soldering is taking place. As a result, a continuous upwardly flowing current of air carries away the heat generated by the heating device. In addition, the cooler air in the draft washes the walls of the housing 1 to maintain them at a relatively low temperature compared with other temperatures within the housing. As a result, the outer surface of the housing 1 which is gripped by the hand of the operator is comfortably cool even when the operator's fingers are grasping the housing very close to the edge of the tip 8. Ordinarily, the dimensions of the housing are such that the outside diameter of the opening 5 is about 25 millimeters for the device of around 25 watts, but may be slightly larger for devices with larger capacity. The device is light in weight, held and manipulated as a pencil with the fingertips relatively close to the tip of the element 8.

When desired, a significantly improved degree of insulation may be obtained by placing an internal insulating element 12 within the housing 1. The internal insulating element 12 may be in contact with the housing 1 as shown on the lower portion of the housing, or it may be spaced from the housing 1 as shown adjacent the left-hand portion of the housing as illustrated in the figure. The device as pictured is particularly desirable with part of the internal insulating element 12 in contact with the housing and part spaced from the housing in that there is a tendency for the rising column of hot air to make the upper portion of the housing immediately to the left of the opening 11 the hottest portion, and the added insulation of the air space between the housing 1 and the inner insulating element 12 reduces the temperature of this portion of the housing.

Although not illustrated, the device of this invention may be employed with auxiliary tools that are known to the art. For example, the device of this invention may be used as a de-soldering device when employed with suitable de-soldering elements which normally are drawn tips attached to a source of vacuum. The proximity and support the extended housing can provide is ideal for mounting and controlling of auxiliary devices such as de-soldering devices. The device of this invention may also be provided with suitable surface contours or texturing, such as with a rough texture, slots or perforations where bleeding air into the interior of the housing is desired, or the like.

The device of this invention may be modified with interchangeable points or with heated blades as when modified for knives to cut plastic or for other uses with a heated tool tip without departure from the scope of the invention.

What is claimed is:

1. A soldering device comprising:
   a housing made of heat insulating material, said housing having an open end, a closed end, and an intermediate opening, with the long axis of said housing including an obtuse angle and with the end opening and the intermediate opening being substantially aligned to provide with said housing a relatively straight, openended passageway and with the outer dimensions of said housing being so proportioned that the soldering device can beheld pencil-fashion with the portion of said housing between said open end and said intermediate opening grasped between the fingers and thumb of the hand with the portion of the housing between the intermediate opening and closed end resting on the back of the hand between the thumb and index finger;
   an electrically operated heating means including a solder contacting element and electric conductive means within said housing and spaced from said housing with the solder contacting element protruding through the open end of said housing and the electric conductive means connected to said solder contacting element, spaced from the housing and being fixed within the closed end of the housing, with said electrically operated heating means including an obtuse angle and positioned substantially coaxial with said housing; and
   means to supply electrical energy to said electrically operated heating means.

2. The device of claim 1 wherein said device includes an interior insulating element within said housing, positioned between said end opening and said intermediate opening and having openings registered with said end opening and intermediate opening, at least a portion of said insulating element being spaced from said housing and from said heating means, and being substantially coaxial with said heating means.

3. The device of claim 1 wherein said device includes an interior insulating element within said housing, positioned between said end opening and said intermediate opening and having openings registered with said end opening and intermediate opening, at least a partion of said insulating element being in contact with said housing and spaced from said heating means and being substantially coaxial with said heating means.

* * * * *